May 15, 1923.
W. R. TALIAFERRO
MOTOR CONTROL SYSTEM
Filed Aug. 18, 1921
1,454,867
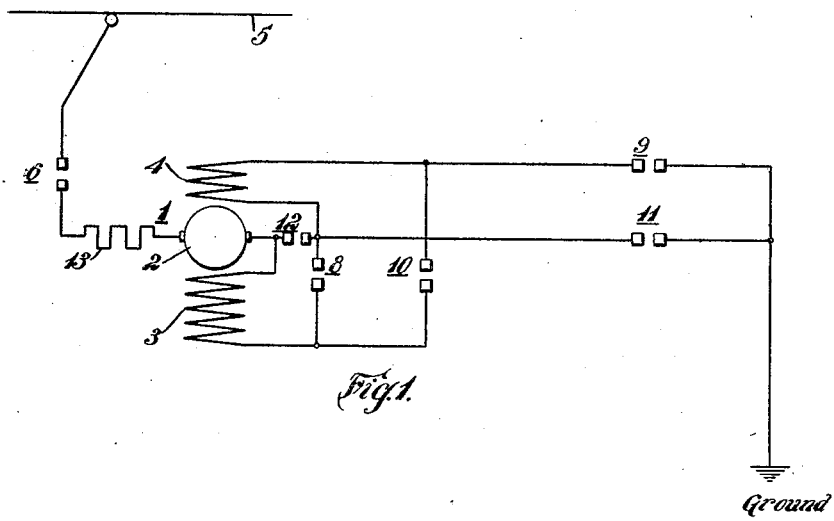
Fig. 1.
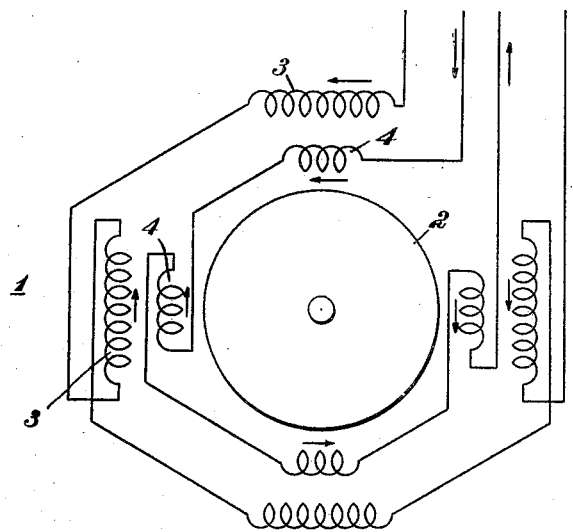
Fig. 2.
Fig. 3.
WITNESSES:
J. P. Wurmb
H. C. Lowe
INVENTOR
William R. Taliaferro.
BY
Wesley G. Carr
ATTORNEY

Patented May 15, 1923.

1,454,867

UNITED STATES PATENT OFFICE.

WILLIAM R. TALIAFERRO, OF PITTSBURGH, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

Application filed August 18, 1921. Serial No. 493,229.

*To all whom it may concern:*

Be it known that I, WILLIAM R. TALIAFERRO, a citizen of the United States, and a resident of Pittsburgh, in the county of Allegheny and State of Pennsylvania, have invented a new and useful Improvement in Motor-Control Systems, of which the following is a specification.

My invention relates to motor-control systems and it has particular relation to control systems for governing the operation of the driving motors of a railway vehicle.

One object of my invention is to provide a control system that shall be relatively simple and economical in construction and positive and reliable in operation.

Another object of my invention is to provide a relatively large number of acceleration steps although employing but relatively few switches.

A further object of my invention is to provide an improved method of interconnecting the field-magnet windings of a motor.

Heretofore, the series of field-magnet windings of railway motors have been provided with a plurality of taps to permit de-energization of a portion of the windings, thereby increasing the speed of the motors. According to my invention, however, I provide two separate series field-magnet windings for a motor, one of the windings being initially employed to increase the magnetization of the motor and later to oppose the other winding to decrease such magnetization.

Briefly speaking, my invention consists in providing a motor with a relatively large series field-magnet winding and a relatively small series field-magnet winding and so winding them upon the poles of the machine that, when the smaller field-magnet winding is energized in one direction, it will increase the magnetization of the motor and when it is energized in the other direction it will oppose the larger field-magnet winding, thereby reducing the effective magnetization of the motor.

For a better understanding of my invention, reference may be made to the accompanying drawing.

Figure 1 of which is a diagrammatic view of a motor and a control system therefor embodying my invention;

Fig. 2 is a diagrammatic view of the windings of the motor that is illustrated in Fig. 1; and Fig. 3 is a sequence chart showing the preferred order of closure of the switches that are illustrated in Fig. 1 of the drawing.

Referring particularly to Fig. 1, the motor 1, having an armature 2 and series field-magnet windings 3 and 4, is energized from a suitable source of electrical energy, such, for example, as a trolley conductor 5 and a return circuit marked Ground, upon the closure of the line switch or circuit-breaker 6 and certain of a plurality of contactors 8 to 12, inclusive, in a manner hereinafter more fully described. A resistor 13 is connected in circuit between the line switch 6 and the armature 2 of the motor 1. It is shunted upon the closure of contactor (not illustrated).

Referring to Fig. 2 of the drawing, the armature 2 of the motor 1 is preferably of standard design and it has been illustrated only diagrammatically, as it is of a construction well known in the art.

The series-field magnet windings 3 and 4 are so interwound upon a plurality of pole-pieces (not shown) of a suitable stator that the magnetization of the winding 4 may assist or oppose the magnetization that is established upon the energization of the series-field-magnet winding 3, depending upon the relative direction of energization of the windings 3 and 4.

The motor 1 may be accelerated by first closing switches 6, 8 and 9, in accordance with position *a* of the sequence chart, thereby establishing a circuit from the trolley 5 through line switch 6, armature 2 of the motor 1, series field-magnet winding 3, switch 8, series field-magnet winding 4 and switch 9 to Ground.

When the above circuit is established, the series field-magnet windings 3 and 4 are cumulatively energized, as indicated by the solid arrows in Fig. 2 of the drawing. Since the series field-magnet winding 4 is energized in the direction whereby its magnetization assists the magnetization caused by energization of the series field-magnet winding 3, the motor 1 is operating under "full-field" conditions.

After the resistor 13 has been shunted and the speed of the motor 1 is sufficient to permit further accelerating steps, the switch 10 may be closed, thereby shunting the series field-magnet winding 4. This operation will increase the speed of the motor 1, as it is then operated with only the field-magnet winding 3 energized. After the switch 10 has closed, the switch 8 may be opened to interrupt the original interconnections of the field-windings 3 and 4.

After the motor 1 has attained a predetermined speed, the switch 11 may be closed and the switch 9 opened, thereby causing the magnetization of the series field-magnet winding 4 to oppose that of the series field-magnet winding 3.

The motor is accelerated further by closing switches 8 and 9 and then opening switches 10 and 11, thereby reversing the energization of field-magnet winding 4. The field-magnet winding 3 is shunted by the closure of switch 12. (See step $d$ of the sequence chart illustrated in Fig. 3.) The switch 8 is then opened to disconnect the winding 3 from the control system. After such operation of switches 8 to 12, inclusive, the motor 1 is operating with only the field-magnet winding 4 energized. The motor 1 will now accelerate to its maximum speed, as it is operating with its weakest magnetic field strength.

It will be apparent that a number of motors may be governed by a control system, in the same manner as has been described for a single motor. The windings may be so connected that the magnetization of one will oppose the other, when the motors are connected in series relation, with the starting resistor shunted and again after the motors have been connected in parallel relation and the starting resistor shunted.

One of the advantages of this method of acceleration is that when the switches 8 to 11, inclusive, are closed in the order shown by the sequence chart, it is unnecessary to momentarily open the armature circuit of the motor, which has been required in some systems of the prior art.

While I have shown my invention in the preferred form, it is apparent that various modifications may be made in the arrangement of windings and switches without departing from the spirit of my invention. I desire, therefore, to be limited only by the scope of the appended claims.

I claim as my invention:

1. In a dynamo-electric machine having an armature and a plurality of field-magnet windings, of means for connecting said armature and said windings in series relation, means for disconnecting one of said windings and means for reconnecting said disconnected windings in opposing relation to another of said windings, the machine circuit remaining closed during such circuit changes.

2. The method of accelerating a motor having a plurality of windings that comprises energizing said windings in the same direction, de-energizing one of said windings and then re-energizing said winding in the opposite direction while maintaining the motor circuits closed.

3. The method of accelerating a motor having two series of field-magnet windings that comprises connecting said windings in series relation, energizing one of said windings in the opposite direction, re-energizing said winding in the original direction, and then de-energizing the other of said windings.

4. The method of accelerating a motor having a large and a small series field-magnet winding that comprises connecting the smaller of said windings in series relation to said larger windings, shunting said smaller winding, reversing the energization of said smaller winding, re-energizing said smaller winding in its original direction and then de-energizing said larger winding.

5. In a control system, the combination with an armature and two field-magnet windings, of a switch for connecting a terminal of one of said windings to a terminal of the other winding, a second switch for connecting the other terminal of one of said windings to the other terminal of the other winding, and a plurality of switches for connecting the terminals of one of said windings to the supply circuit.

6. In a control system, the combination with an armature and a plurality of field-magnet windings, of one switch for connecting the terminal of one of said windings to the terminal of another of said windings, a second switch for connecting the other terminal of one of said windings to the other terminal of the other of said windings, a plurality of switches for connecting one of said windings to the supply circuit and a switch for connecting said armature to one of the terminals of one of said windings.

In testimony whereof, I have hereunto subscribed my name this 9th day of August 1921.

WILLIAM R. TALIAFERRO.

Certificate of Correction.

It is hereby certified that in Letters Patent No. 1,454,867, granted May 15, 1923, upon the application of William R. Taliaferro, of Pittsburgh, Pennsylvania, for an improvement in "Motor-Control Systems," errors appear in the printed specification requiring correction as follows: Page 1, line 24, and page 2, line 74, claim 3, strike out the word "of"; and that the said Letters Patent should be read with these corrections therein that the same may conform to the record of the case in the Patent Office.

Signed and sealed this 19th day of June, A. D., 1923.

[SEAL.]
WM. A. KINNAN,
*Acting Commissioner of Patents.*